(12) United States Patent
Baston (10) Patent No.: US 8,467,670 B2
(45) Date of Patent: Jun. 18, 2013

(54) PORTABLE HOT BEVERAGE MAKER

(76) Inventor: Pierre Maurice Baston, Philadelphia, PA (US)

( * ) Notice: Subject to any disclaimer, the term of this patent is extended or adjusted under 35 U.S.C. 154(b) by 572 days.

(21) Appl. No.: 12/673,405

(22) PCT Filed: Aug. 13, 2008

(86) PCT No.: PCT/US2008/073018
§ 371 (c)(1),
(2), (4) Date: Feb. 12, 2010

(87) PCT Pub. No.: WO2009/023712
PCT Pub. Date: Feb. 19, 2009

(65) Prior Publication Data
US 2011/0103779 A1 May 5, 2011

Related U.S. Application Data

(60) Provisional application No. 60/964,317, filed on Aug. 13, 2007.

(51) Int. Cl.
*A01K 63/06* (2006.01)

(52) U.S. Cl.
USPC .............................. 392/444; 99/288; 99/285

(58) Field of Classification Search
None
See application file for complete search history.

(56) References Cited

U.S. PATENT DOCUMENTS

| | | | |
|---|---|---|---|
| 4,674,400 A | 6/1987 | Rondel et al. | |
| 4,721,035 A | 1/1988 | Chang-Diaz | |
| 5,218,667 A | 6/1993 | Martin | |
| 5,233,914 A | 8/1993 | English | |
| 5,518,142 A | 5/1996 | Lin | |
| 5,778,765 A | 7/1998 | Klawuhn et al. | |
| 6,460,735 B1 | 10/2002 | Greenwald et al. | |
| 6,564,975 B1 | 5/2003 | Garman | |
| 6,948,421 B2 | 9/2005 | Meador | |
| 6,997,104 B1 | 2/2006 | Lin | |
| 2003/0070430 A1 | 4/2003 | Beckius et al. | |
| 2006/0102010 A1 | 5/2006 | Burrows | |

FOREIGN PATENT DOCUMENTS

GB 1395507 A 5/1975

OTHER PUBLICATIONS

Contigo,The AUTOSEAL West Loop Travel Mug,http://www.gocontigo.com/ website, Copyright 2009 gocontogo.com, Chicago, IL, USA.
Author Unknown,Mate a Mate Nuevo y Exclusivo Termo / Mate, http://mateamate.com.ar/,Copyright 2003 / 2008—Mate a Mate, Argentina/Brazil/Uruguay.

*Primary Examiner* — Thor Campbell (57) ABSTRACT

A hot beverage making container having a main body that includes a water tank and a heating chamber separated by a first valve. A removable brewing cup is connected to the main body and is separated from the heating chamber by a second valve. A tube extends from the brewing cup, through the main body, and out of the main body.

15 Claims, 7 Drawing Sheets

PORTABLE HOT BEVERAGE MAKER

CROSS REFERENCE TO RELATED APPLICATION

This application claims priority of U.S. Provisional Application Ser. No. 60/964,317 filed Aug. 13, 2007, the entire disclosure of which is incorporated herein by reference.

BACKGROUND OF THE INVENTION

Infused beverages like South American mate, tea, and other herbal drinks require the inundation of the flavoring ingredient by hot water. The best water temperatures for brewing beverages are specific and various, depending on the herb. Preparing these beverages away from home has long been a challenge because of the equipment and precise water temperatures required.

Perhaps the most common form of personal, portable brewing system until now has been a kit consisting of brewing cup, herbal leaves, and thermos filled with hot water. However, such a kit can be large and cumbersome, and unsatisfying too. Pouring from thermos to open brewing cup can lead to spills in moving vehicles or active environments. Additionally, once-hot water in even a good thermos can cool to sub-optimal temperature before use.

Numerous concepts have improved portability by combining thermos, brewing cup and drinking straw in a single compact unit (for example, patents AR 001471, AR 010084, AR 011926, and AR 242491), but the hot water with which the user fills these devices may still cool before he is ready to brew.

There are many electric-powered beverage heaters that both preserve water temperature and offer some degree of portability, like U.S. Pat. No. 6,140,614 and AR 040327. However, these are little more than electric kettles or mugs that plug into automobile cigarette lighters. The devices can heat water or a beverage that is already brewed, but they themselves do not specifically support brewing, and may provide no integrated means for drinking any beverage they contain. A brewing vessel, herbal leaves, and in some cases a cup or straw must be carried and used separately for brewing, so users would find these devices as awkward to employ as earlier thermos-based kits. Portability of these devices is further limited by the need for a 12V automobile battery for power.

Patents AR 233572 and AR 221617 are examples of portable, electrically-powered devices that heat water and are specifically designed for preparing mate or other infusions. However, like most electric kettles or mugs, they fail to provide for a self-contained power source, so their use is similarly limited to automobile or home. Further limiting utility of these electric infusion makers, the user must pour the ready beverage into a separate cup to drink, so spills can still occur in settings like crowded stadiums or moving buses.

Finally, there are many forms of electric coffee maker that are, to a degree, portable. U.S. Pat. No. 6,123,010 even describes one powered by self-contained batteries. However, standard drip coffee makers like U.S. Pat. No. 6,123,010 depend on the use of boiling water. They need the bubbles produced by water heated to 100 degrees Celsius to propel the water up the tube from the heating element in the device's base, to the drip hole above the filter that holds the coffee grounds. Unfortunately, boiling water is strictly contraindicated for mate, select green and oolong teas, and various other herbal infusions. The lower oxygen content of boiling water gives it a higher capacity than sub-boiling water to extract key molecules from delicate herbal leaves. As a result, boiling water (or even boiled water allowed to cool) strips mate and similar leaves of their flavor in a single steeping, instead of allowing for the measured release of flavor over a number of steepings, as custom requires. The optimal water temperatures for mate and select Chinese teas range from 70 to 80 degrees Celsius—far cooler than the boiling temperature that standard drip coffee makers universally produce. In addition, U.S. Pat. No. 6,123,010 is clearly too large to be considered personal and portable, and would have to dispense beverages into a separate cup, with the attendant risk of spills. The detachable beverage mug also described in the U.S. Pat. No. 6,123,010 patent document is small and portable, spill-proof and powered by a self-contained battery, but it lacks any provision for brewing and functions no differently than electric mugs already discussed.

By contrast, the present invention permits the heating of water to any target temperature, and the brewing of a beverage in multiple, discrete steepings, in accordance with the South American mate and Chinese Gongfu tea traditions. Within a small and portable, spill-proof unit, the device brews hot beverages at the moment of use for freshest flavor and (in preferred embodiments) perfect temperature with every swallow. The invention enables the user to accomplish high-quality brewing while riding the subway or sunning at the beach far from stove, household outlet or automobile.

The present invention addresses shortcomings in prior art in the following ways:

1) It is a small and portable, integrated and enclosed device for brewing hot beverages like South American mate and tea that heats cold water to target temperature by power of a self-contained battery. Because the device's battery is self-contained, users will be able to brew and drink hot beverages virtually anywhere they go, including on moving vehicles and in crowds, and even when stove, household outlet, and car battery are not accessible. Prior inventions fail to achieve the foregoing specification in one or more of the following ways: a) they are not small enough to carry easily; b) they lack specific provisions for brewing; c) they consist of multiple loose parts carried or used separately; d) they are open to spills; or e) they are not powered by self-contained battery for absolute freedom of movement.

2) It is as described in point 1 above, and employs serial heating, heating only a small amount of water at a time. Earlier electric infusing devices require heating the total volume of water they contain, and then infusing that full volume before the user can start to drink.

By contrast, the present invention capitalizes on the serial brewing method characteristic of South American mate and Chinese Gongfu tea traditions. With mate and select green and oolong teas, the leaves for infusion are steeped not once, but up to 8 or more times. The small quantity of infusion produced by each steeping is consumed by the user before the leaves are inundated again with hot water for the next steeping. When the flavor is finally deemed exhausted, the used mate or tea leaves are discarded and replaced by fresh leaves for a new round of brewing.

Consonant with these traditions, the present invention heats just 1 ounce of water at a time, and brews just 1 ounce of mate or tea infusion at a time, and can repeat this process 8 or more times to produce a full serving of 8 ounces or more of beverage before being refilled with water and fresh herbal leaves. The advantages derived from this serial heating process are: a) a much shorter time that the user must wait for water to be heated before the first sip; b) more efficient energy use, with resulting benefits in the weight, size and cost of the battery; and c) a more satisfying drinking experience that emulates traditional mate and Gongfu tea practices.

The first advantage of serial water heating (as opposed to the total-capacity heating of prior art) is a dramatically shorter wait-time for the user. Comparable electric infusing devices of prior art would apply heat to all of the water they contained until the total volume reached target temperature and the brewing and drinking could begin. By contrast, the present invention utilizes a heating chamber—separate from the main water storage compartment—in which just 1 ounce of the device's total water capacity can be heated and then distributed to the brewing chamber for infusion. As a result, for two devices of equal wattage, and holding equal 8-ounce total volumes of water for infusion, the present invention will produce infusion for the user's first sip in just ⅛ the waiting time required by a device of prior art (since 1 ounce takes ⅛ the time to heat that 8 ounces take). Then, as the user of the present invention sips the first ounce of infusion, an ounce of water for the next steeping can be heated simultaneously. In this way, he can drink 1 ounce of his hot beverage after another with little or no waiting between steepings, until the entire 8-ounce serving is consumed.

In addition to shortening waiting time, serial heating saves energy. Because the invention heats only as much water as the consumer will use immediately (1 ounce), it does not waste energy maintaining water temperature as total-capacity heating would require. Consequently, the present invention's battery can be small and light enough for containment in a personal, portable brewing system—an objective previous art could never achieve.

Finally, serial heating and brewing preserve certain key qualities of the mate- and Gongfu tea-drinking experiences. Both traditions highly prize the leisurely consumption of the beverages. In both, the infusions are typically consumed in quantities of about 1 ounce at a time, to permit the careful appreciation of flavor.

3) It is as described in points 1 and 2 above, and has a folding drinking straw. The folding straw makes the invention more compact by folding out of the way when not needed. It is also very convenient to deploy or store with just a single motion, according to the user's changing wishes. Also, because the straw remains attached, it can never be lost.

4) It is as described in points 1-3 above, and has a single-motion 3-way vent cap. The vent tubes from the water tank, heating chamber and brewing cup all terminate at a single vent cap that the user can open and close with a single, simple motion.

5) It is as described in points 1-4 above, and has push-button water valves. The valve controls, operable by one hand, allow the user to move water easily from water tank, to heating chamber, to brewing cup—all from the outside of the device, without open pouring and the risk of spills.

BRIEF SUMMARY OF THE INVENTION

A portable brewing container having a main body and an attached, releasable brewing cup is disclosed. The main body is separated into a water tank and a heating chamber by a first and a second valve. The water tank is defined by a top wall or cap, a side wall, and a divider containing the first valve. The heating chamber is defined by the divider containing the first valve, a side wall, and a divider containing the second valve. The heating chamber contains a heating element. A pair of buttons are associated with the first valve and the second valve. Activation of the first valve moves water from the water tank to the heating chamber. Activation of the second valve moves water from the heating chamber to the brewing cup. A filtered drinking straw extends from the brewing cup through the main body and outwardly from the top wall or cap.

DETAILED DESCRIPTION OF THE PREFERRED EMBODIMENTS

Figures 1, 2:
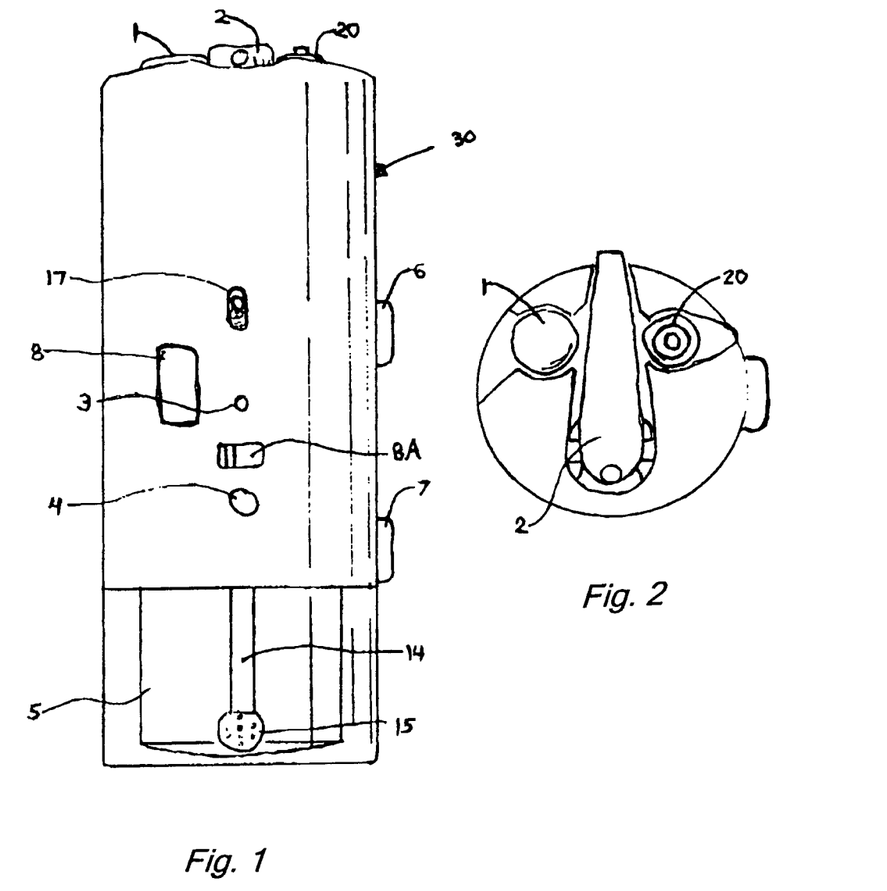
FIG. 1 is a front plan view of a hot beverage maker.
FIG. 2 is a top plan view of a hot beverage maker.

FIG. 1 and FIG. 2 show the exterior of a preferred embodiment of the invention. All or just some of the individual features depicted and described may actually be employed in any eventual embodiment. The container has a main body 30. Filling cap 1, folded drinking straw 2, and vent cap 20 appear on top of the device. The clear water-tank window 17 with floating indicator shows the level of water remaining in the internal water tank. Signal LED 3 informs the user of whether the heater is off or on, and of whether or not the water in the heating chamber has reached target temperature. Power switch 4 turns off the heater whenever the user desires. Temperature display 8 indicates current temperature of water in the heating chamber. Temperature set switch 8A allows the user to set the target temperature for the water to be heated. Push-button valve control 6 moves cold water from the water tank into the heating chamber, and turns the heater on. Valve control button 7 moves the hot water from the heating chamber into brewing cup 5, turns the heater off, and turns on the illuminating LEDs that light brewing cup 5 and water-tank window 17. Visible through the clear walls of brewing cup 5 is tube filter 15 at the end of central tube 14, which carries infusion to drinking straw 2 and the mouth of the user when he sucks.

Figure 3:
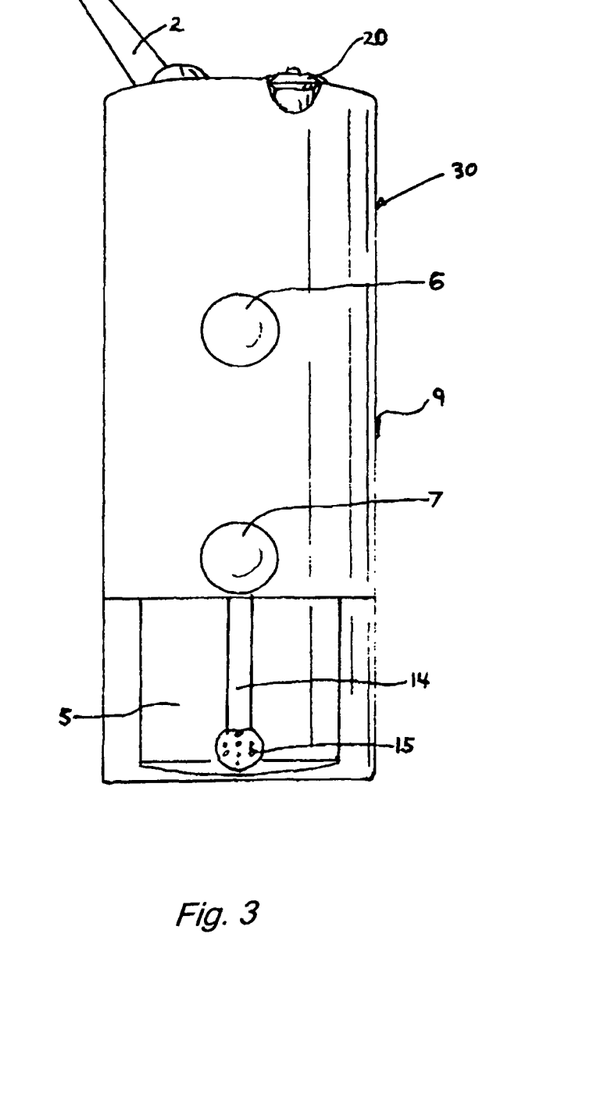
FIG. 3 is a right-side plan view of a hot beverage maker.

FIG. 3 shows upper and lower valve-control buttons 6 and 7, and power jack 9, where an AC power cord or an automobile power cord can be plugged in. Drinking straw 2 is shown here in the unfolded position—the position in which it is ready to use.

Figure 4:
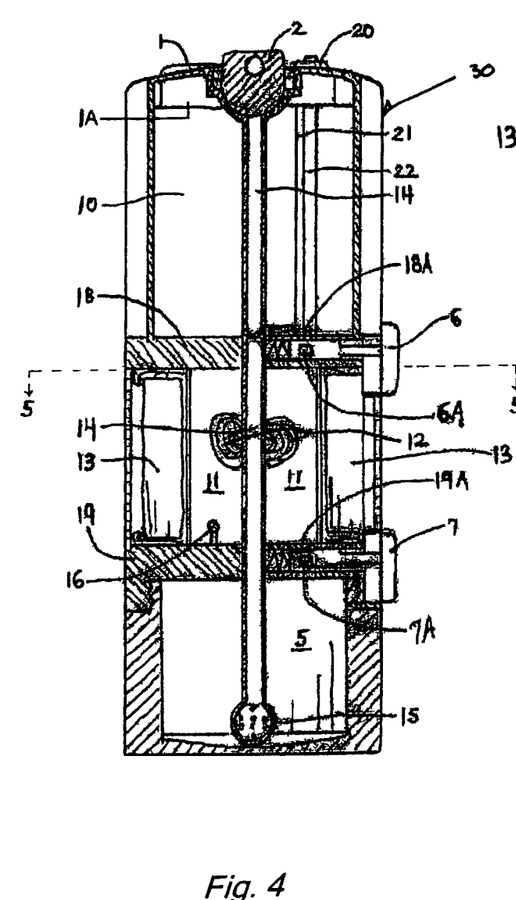
FIG. 4 is a sectional view of a hot beverage maker taken on the line 4-4 of FIG. 6.

FIG. 4, a sectional front view, shows water tank 10 at the top, heating chamber 11 and battery 13 in the middle, and brewing cup 5 at the bottom of the device. Central tube 14 carries the prepared beverage up from tube filter 15 at one end, to folding drinking straw 2 at the other. Cold water is introduced into water tank 10 via filling hole 1A. Water is released from water tank 10 and passes through hole 18A into heating chamber 11 by means of valve 6A, which is normally closed, but which is opened when the user actively depresses valve control 6. When the user releases valve control 6, valve 6A closes again. Valve 7A is identical to valve 6A, and serves to move the hot water from heating chamber 11 through hole 19A to brewing cup 5, where it inundates the mate or tea leaves to achieve infusion.

In FIG. 4, valves 6A and 7A are depicted as push-valves fitted with springs that automatically reclose the valves. In alternative embodiments, the valves may employ any of a number of opening and self-closing mechanisms, whether rotary, butterfly, gate or other valve designs, to enable easy one-handed actuation. In an alternative embodiment of the invention, for greater ease of use, mechanical push-buttons 6 and 7 would be replaced by electrical switches that activated electrical motors to open and close the valves. In another alternative embodiment, mechanical push-buttons 6 and 7 would be replaced by a single electrical switch that would initiate a programmed sequence to open and close valve 6A, heat the water to target temperature, and open and close valve 7A in response to a single button push.

Heating chamber 11 is where the cold water is heated to target temperature by means of heating element 12. In FIG. 4, the heating element is depicted as a coil inside the heating chamber. In alternative embodiments, the heating element might have any shape. The heating element might also be on one or two sides of the heating chamber, or may surround it completely like a sleeve, or assume any of a number of configurations outside of the heating chamber, thereby avoiding direct contact with the water itself. The same variability of form in temperature sensor 16 is also encompassed by this invention. The heating chamber itself can vary in shape, orientation and size among possible embodiments, and may be tubular, horizontal, or more narrow than depicted here. Vent tube 22 starts as a hole in the top of heating chamber 11, emerges from the top of divider 18, and then rises next to vent tube 21 to attach to vent cap 20.

Figure 5:
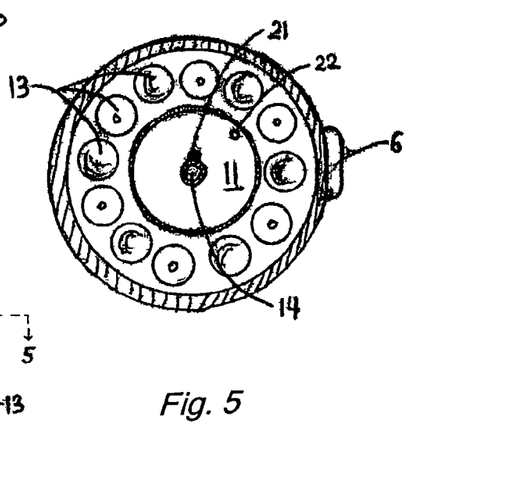
FIG. 5 is a sectional view of a hot beverage maker taken on the line 5-5 of FIG. 4.

FIG. 4 and FIG. 5 show internal battery 13, which in various possible embodiments may consist of multiple individual connected cells. Battery 13, or its multiple connected constituent cells, may be located in a battery chamber that surrounds heating chamber 11 along the inside wall of the device's middle section. The concentric placement of heating chamber and battery cells ensures the overall balance and stability of the device when set down or held.

Figures 6, 7:
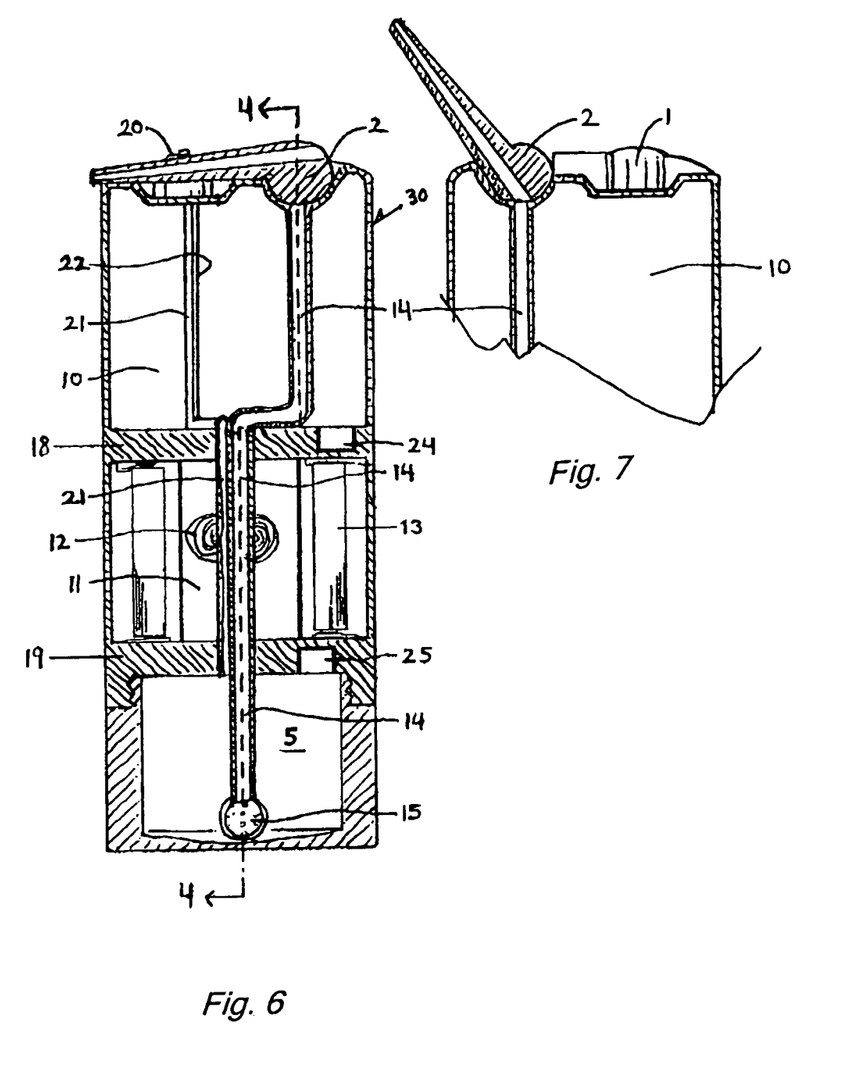
FIG. 6 is a left-side sectional view of a hot beverage maker.
FIG. 7 is a partial right-side sectional view of a hot beverage maker.

Illuminating LED 24 in FIG. 6 allows the user to view the amount of water remaining in water tank 10 above it (through water-tank window 17), even in a dark setting. Illuminating LED 25 similarly permits the user to see the level of water introduced into transparent brewing cup 5. FIG. 6 depicts LEDs 24 and 25 each as a single LED. In alternative embodiments, the illumination for the brewing cup could be a series of LEDs distributed evenly along the bottom rim of divider 19, or a continuous tubular ring light set into the rim, that would shine light evenly around the circumference of transparent brewing cup 5 below it.

FIG. 6 further shows brewing cup 5 vented by venting tube 21, which rises from a hole in the bottom of divider 19 to the top of divider 18. There, venting tube 21 joins venting tube 22 and rises to attach to vent cap 20.

FIG. 6 and FIG. 7 show sectional views of drinking straw 2. Drinking straw 2 folds and unfolds by pivoting on posts extending into recesses in the device's top. When unfolded for use as shown in FIG. 7, the channel inside drinking straw 2 aligns with the end of central tube 14, and user can sip beverage up from brewing cup 5. When drinking straw 2 is folded for travel (FIG. 6), its inner channel does not align with central tube 14, and no liquid can leak out.

Figure 8:
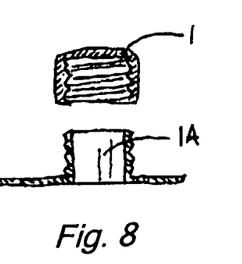
FIG. 8 is a sectional view of a filling cap.

FIG. 8 shows filling cap 1 and filling hole 1A.

Figure 9A:
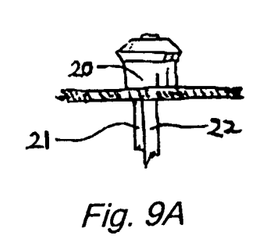
FIG. 9A is a sectional view of a vent cap in closed position.
Figure 9B:
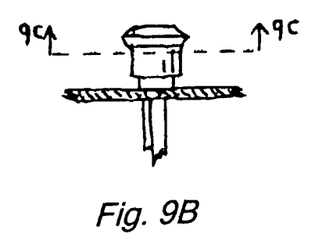
FIG. 9B is a sectional view of a vent cap in open position.
Figure 9C:
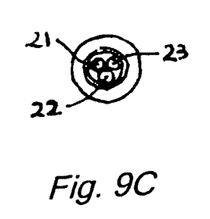
FIG. 9C is a sectional view of a vent cap taken on line 9C-9C of FIG. 9B.

FIG. 9A shows vent cap 20 in the closed position. FIG. 9B shows vent cap 20 in the open position. FIG. 9C shows vent tubes 21 and 22 and vent hole 23 terminating in the underside of vent cap 20.

Figure 10:
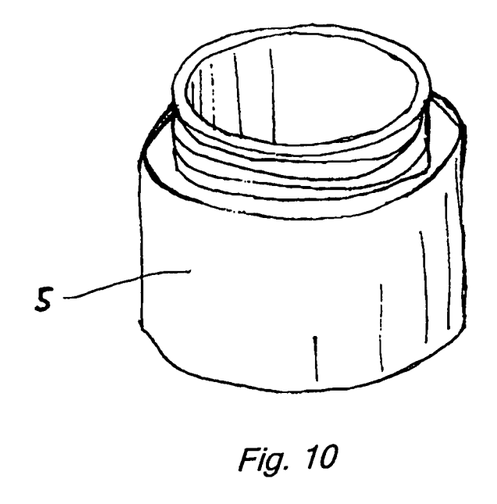
FIG. 10 is a perspective view of a brewing cup.

FIG. 10 is a perspective view of brewing cup 5.

Figure 11:
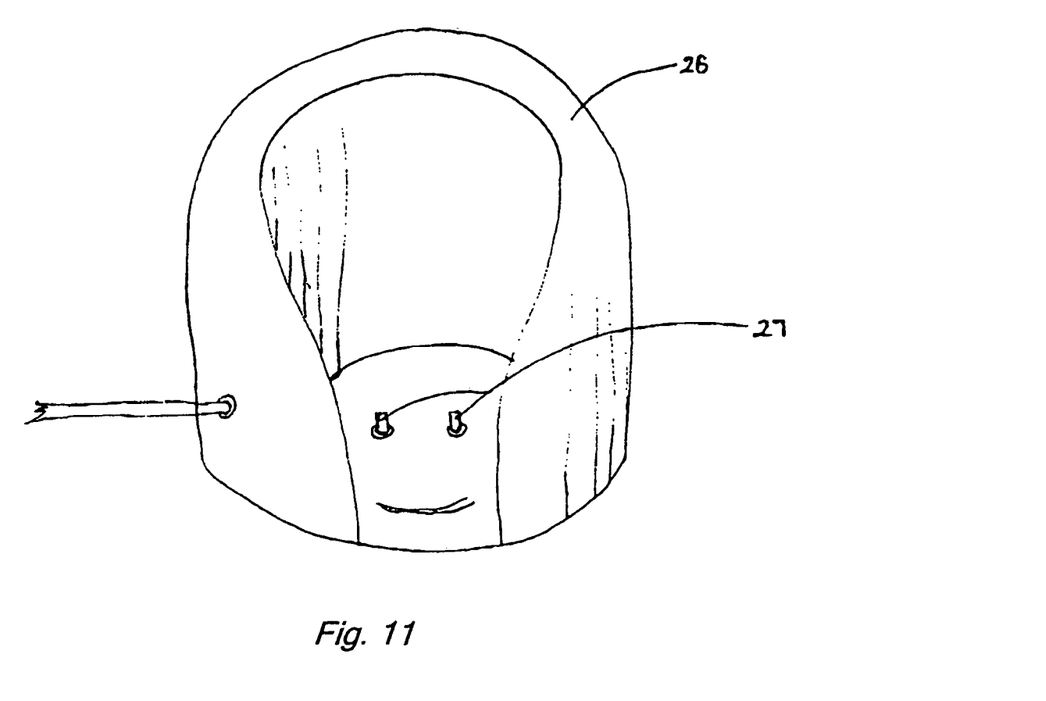
FIG. 11 is a perspective view of a charging base.

FIG. 11 shows charging base 26, which allows the device to recharge internal battery 13, or to operate directly from the household outlet or automobile cigarette lighter into which charging base 26 is plugged. When the device is set down on charging base 26, electrical contacts on the bottom of brewing cup 5 engage complementary contacts 27 in the charging base to make the connection. For cordless use without the internal battery, a user could plug charging base 26 into a household outlet or automobile cigarette lighter, place the device on the charging base to heat water, and then remove the device from the base to consume the hot beverage while roaming cordlessly. He could return the device to the charging base to heat more water when ready for the next round. In alternative embodiments, the charging base could have other shapes, orientations, and means of coupling with the device. The electrical contacts in the charging base and device could be rings, bars or plates, among other possibilities. Also, the contacts on the device might be located on the side of the main body of the device instead of on the bottom of brewing cup 5, and the charging base, or part of it, could be vertical, inclined, or totally flat.

Figure 12:
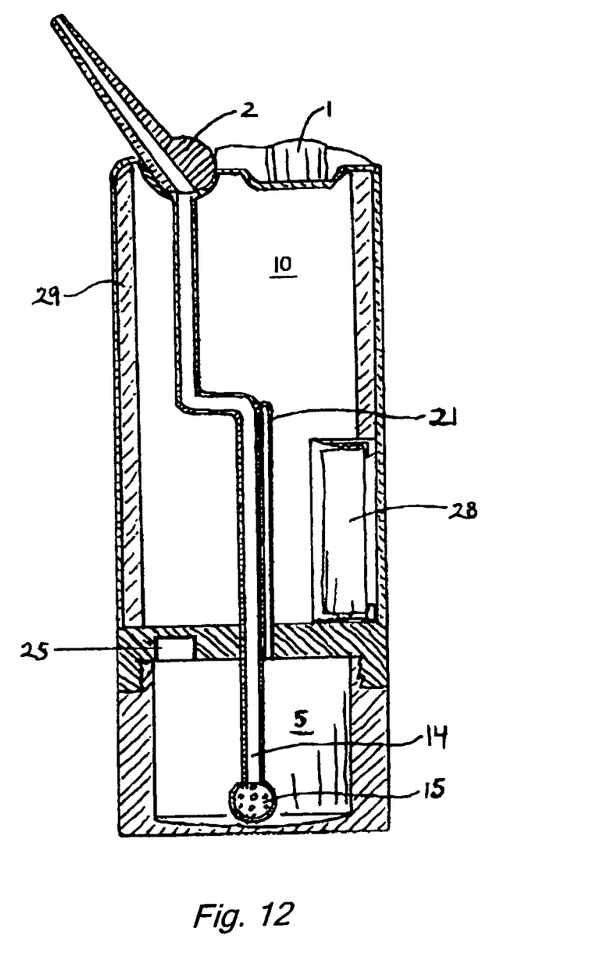
FIG. 12 is a right-side sectional view of an alternative hot beverage maker

FIG. 12 shows an alternative, more affordable embodiment of the invention that does not heat water, but still allows the fresh brewing and dispensing of hot beverages on-the-spot within a portable, integrated spill-proof unit.

FIG. 12, an internal view, shows miniature power cell 28 and illuminating LED 25. Since cell 28 would only power the LED and not heat water, it would be extremely small, inexpensive and disposable. The user would heat water by other means (typically, a stove), and then fill this embodiment with water already hot. This embodiment would dispose of a single push-button valve control. When the user pushed the valve control, he would release hot water from water tank 10 into brewing cup 5, and also turn on illuminating LED 25. By looking through the clear walls of brewing cup 5, he would see when the cup was full and then release the button to close the valve and turn off the LED. Because the water in water tank 10 would be poured in already hot, and have to remain hot until ready for use, the tank is enclosed in thermal insulation 29. As previously mentioned, the number and configuration of illuminating LEDs for the brewing cup may be different from those shown in FIG. 12. In an alternative non-heating embodiment of the invention, the illuminating LED may be powered by inexpensive, self-charging solar cells deployed on the outer surface of the main body. In another possible embodiment, there would be no illuminating LED or power cell at all. In this last-mentioned embodiment, the user would gauge the water level in the brewing cup by available light alone, or the valve would dispense a fixed dose of water every time.

In operation of a preferred embodiment, brewing cup 5 is unscrewed and filled with a suitable amount of mate or tea leaves, or other brewing ingredient. The brewing cup then is reattached to the main body, drinking straw 2 is unfolded for use, and vent cap 5 is opened. Water tank 10 is filled by unscrewing filling cap 1 and adding cold water through filling hole 1A.

To heat the water, power may be provided in a number of ways. For example, a power cord may be plugged into a household electrical outlet or automobile cigarette lighter at one end, and power jack 9 at the opposite end. Alternatively, the device may be set into a charging base 26 that is connected to outlet or automobile lighter. Alternatively, the device may be powered by self-contained battery 13.

Once power is supplied, the desired water temperature is set with switch 8A. Then, valve control button 6 is activated to release water from tank 10 into heating chamber 11 through valve 6A, and to activate heating element 12. Signal LED 3 blinks to indicate that heating chamber 11 has been filled and heating element 12 is on. The current temperature of water in the heating chamber is shown on temperature display 8.

When the water in heating chamber 11 reaches target temperature, LED 3 changes color and/or an audible signal sounds. Then, valve button 7 is engaged to release the hot water from heating chamber 11 into brewing cup 5 through valve 7A, to turn off heating element 12, to turn off signal LED 3, and to activate illuminating LEDs 24 and 25. At this point, the brewed beverage is ready to drink via filter 15, central tube 14, and external folding straw 2. The steps for heating, brewing and sipping above can be repeated as desired until a full serving is consumed.

In an alternative embodiment of the invention, an automatic cut-off function would automatically turn off heating element 12 when the target water temperature was reached. In an alternative embodiment employing a single electric switch and program instead of 2 mechanical push buttons, multiple steps above would be replaced by a single step: "Push electrical switch." In an alternative embodiment employing a heating chamber and heating element configured to provide "instant heating" of a small, continuous stream of water, the number of steps would be reduced similarly. In alternative economical embodiments of the invention that would not heat water, but instead brew on demand with water previously heated by other means, the method of use would be simpler still.

The foregoing disclosure has been set forth merely to illustrate the invention, and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A portable hot beverage maker and brewing container, whose parts are integrated into a compact, hermetically sealable unit that can be carried while being used, comprising, when in use: a main body having a water tank and a heating chamber that are separated by a first valve; a detachable brewing cup connected to the main body and separated from the heating chamber by a second valve; and a tube that carries the brewed beverage from the brewing cup, through the main body, and out of the main body through a drinking-straw mouthpiece.

2. The container of claim 1 further comprising a signal to indicate whether a heating element disposed within the heating chamber is activated.

3. The container of claim 1 further comprising a switch to select a desired temperature, within the heating chamber, of water to be used for brewing.

4. The container of claim 1 further comprising a heating element powered by connection to a battery.

5. The container of claim 1 further comprising a power base that is releasably connected to the container.

6. The container of claim 1 further comprising a temperature display associated with the heating chamber.

7. The container of claim 1 further comprising at least one illuminating LED associated with the container.

8. A portable hot beverage maker and brewing container, whose parts are integrated into a compact, hermetically sealable unit that can be carried while being used, comprising, when in use: a water tank; a detachable brewing cup connected to the water tank; a valve or valves that separate the water tank from the brewing cup; and a tube that carries the brewed beverage from the brewing cup, through the main body and out of the main body through a drinking-straw mouthpiece.

9. The container of claim 8 further comprising a heating element in the water tank.

10. The container of claim 9 further comprising a signal to indicate whether the heating element is activated.

11. The container of claim 9 further comprising a switch to select a desired temperature, within the water tank, of water to be used for brewing.

12. The container of claim 9 wherein the heating element is powered by connection to a battery.

13. The container of claim 9 further comprising a power base that is releasably connected to the container.

14. The container of claim 9 further comprising a temperature display associated with the water tank.

15. The container of claim 9 further comprising at least one illuminating LED associated with the container.

\* \* \* \* \*